United States Patent [19]

Wehrmann et al.

[11] E Re. 31,421

[45] Reissued Oct. 18, 1983

[54] BUILDING ELEMENTS AND THEIR PREPARATION

[75] Inventors: Felix Wehrmann, Vienna; Rene-Hagen Voelki, Maria Enzersdorf; Edwin Wojta, Aigen, all of Austria

[73] Assignee: Isovolta Osterreichische Isolierstoffwerke Aktiengesellschaft, Wiener Neudorf, Austria

[21] Appl. No.: 300,250

[22] Filed: Sep. 8, 1981

Related U.S. Patent Documents

Reissue of:

[64] Patent No.: 4,191,667
Issued: Mar. 4, 1980
Appl. No.: 890,015
Filed: Mar. 24, 1978

[30] Foreign Application Priority Data

Mar. 25, 1977 [AT] Austria ..... 2084/77

[51] Int. Cl.[3] ..... C08J 11/00; C08K 7/26

[52] U.S. Cl. ..... 521/42; 106/83; 106/84; 264/37; 428/407; 521/40; 521/49; 524/450

[58] Field of Search ..... 260/2.3, 38, 39 R; 106/83; 264/25, 37, 112, 120, 122; 428/407; 524/450; 521/40, 42, 49

[56] References Cited

U.S. PATENT DOCUMENTS

| | | | |
|---|---|---|---|
| 1,831,779 | 11/1931 | MacDonald | 264/37 |
| 1,963,030 | 6/1934 | Powell | 264/37 |
| 3,736,277 | 5/1973 | Bender | 260/2.3 |
| 4,093,488 | 6/1978 | Kirsch et al. | 264/25 |

*Primary Examiner*—Allan Lieberman
*Attorney, Agent, or Firm*—Hammond & Littell, Weissenberger and Muserlian

[57] ABSTRACT

An improved building material element or board having good thermal insulation properties comprising expanded vermiculite granules coated with 2 to 30% by weight, based on the weight of vermiculite, with an organic binder formed into a press cake which is then press heated to form the building element, the improvement comprising that at least a portion of the coated vermiculite granules are recycled particles which increases the density and has a more uniform and more easily sized surface and a process for its preparation.

9 Claims, 2 Drawing Figures

BUILDING ELEMENTS AND THEIR PREPARATION

Matter enclosed in heavy brackets [ ] appears in the original patent but forms no part of this reissue specification; matter printed in italics indicates the additions made by reissue.

STATE OF THE ART

In commonly assigned, copending U.S. patent application Ser. No. 657,273 filed Feb. 11, 1976 now U.S. Pat. No. 4,093,488, there is described an incombustible building element having good thermal insulation properties made of granulated expanded vermiculite coated with an organic binder which is formed into a press cake which is then hot pressed into a board type building element which is then trimmed and optionally ground to a specific thickness.

The waste resulting from the trimming and rejected building elements amounts to about 9 to 12% by weight of the starting material used and the grinding operation can result in an additional 3 to 12% by weight of waste material. This relatively large amount of waste not only increases costs but also creates disposal problems which are sometimes difficult to solve since the organic binders, while not lethal are somewhat water soluble. This creates a water pollution problem in addition to the problem of solid waste disposal.

OBJECTS OF THE INVENTION

It is an object of the invention to provide an improved incombustible building element having good thermal insulation properties and an increased density of at least 600 kg/m$^3$.

It is another object of the invention to provide a novel process for the preparation of incombustible building elements with no or substantially reduced waste disposal problems.

These and other objects and advantages of the invention will become obvious from the following detailed description.

THE INVENTION

The novel building material element having good thermal insulation properties of the invention is comprised of expanded vermiculite granules coated with 2 to 30% by weight, based on the weight of vermiculite, with an organic binder formed into a press cake which is then press heated to form the building element, the improvement comprising that at least a portion of the coated vermiculite granules are recycled particles.

The invention solves the waste disposal problem as the shredded trimming or scrap pieces and/or the dust particles from the grinding are admixed with the expanded unsized vermiculite granules in a weight ratio of 5 to 30%, preferably up 8 to 25% and leads to an improved product. Normally, recycling of waste material for admixture with the starting material in the production of building materials does not lead to an improvement of the end product.

Surprisingly, however, the product resulting from the process of the invention has superior mechanical properties provided the expanded vermiculite is homogenously admixed with the recycle material. Tests have generally shown that with about the same charge of fresh raw material (i.e.—the same charge of vermiculite and binder per m$^3$ of produced building element), a much higher bending strength is obtained for the building element containing recycle material as compared to a building element without recycle material. Moreover, the building elements of the invention have a greater density.

Another advantage in the product of the invention is unexpectedly obtained when the grinding dust is recycled. Without dust addition, the surface of the building element is relatively coarse in structure and the surface absorption capacity is not uniform over the surface which makes it difficult to uniformly size the surface thereof required before applying a coating thereto. However, the building element of the invention has a closed, uniform, easily sized surface if sufficient amounts of recycle material are used such as 15 to 30% by weight based on the total weight of the building element.

The novel process of the invention for the preparation of a building element comprises forming expanded vermiculite at an elevated temperature, admixing the vermiculite with 2 to 30% by weight of the vermiculite with a binder, forming the resulting mixture into a prepress cake, heating the press cake under pressure to a density of at least 600 kg/m$^3$ to form the building element, the improvement comprising admixing the vermiculite with granular or powdered recycled waste material from previous operations.

In a preferred mode of the process of the invention, a uniform mixing of the recycle material and expanded vermiculite is obtained if the recycle material and the expanded vermiculite granules, preferably still hot, are added to a fluidized bed for mixing. The fluidized bed chamber for the fluidized bed of particles preferably has an elongated form and at the same time serves as a means to transport the mixture to the next step. In a variation of the process, granules and/or pulverized additives which optionally may be binders may also be mixed in the fluidized bed.

The invention is adapted to be used with any suitable organic binder but particularly used when an incombustible building element is desired is an organic binder consisting of a resin mixture or mixed resin, with at least one combustible resin component and at least one incombustible nitrogen-containing resin component. The combustible resin component is advantageously a phenol resin and/or the incombustible nitrogen-containing resin component is a urea resin, while the content of urea resin component in the resin mixture or mixed resin amounts to from 10 to 25 mole percent.

If fire should occur the action of heat on the urea resin in a building element of this kind will produce an atmosphere having a high nitrogen content, which will prevent the combustion of the combustible resin component (phenol resin) to such an extent that carbonization does not occur but only so-called coalification, through which a dense thermally stable layer of carbon is form on the surface of the building elements.

In a preferred embodiment of the invention, the building material element is characterized in that it also contains waterglass as additional binder. The proportion of waterglass in the entire quantity of binder, calculated as solid material, amounts to at least 10% by weight. The addition of waterglass to the binder has, among other results, the effect of increasing the fire resistance of the building material element of the invention.

Referring now to the drawings.

Figure 1:
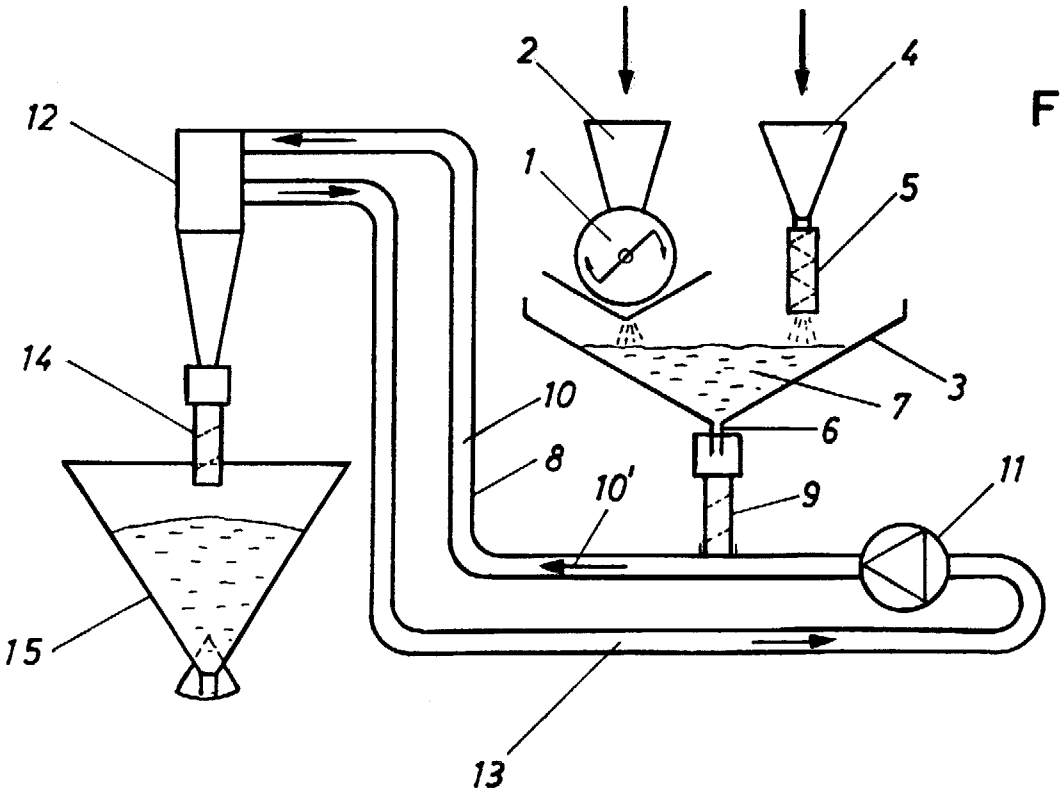
FIG. 1 is a schematic diagram of an apparatus for preparing the mixture of expanded vermiculite and recycle material.

In FIG. 1, granulated vermiculite is supplied by hopper 2 to rotary tube furnace 1 and the vermiculite is expanded therein during its passage through the furnace at 850° C. The expanded vermiculite is collected in basin 3 and shredded waste material from scrap pieces and/or trimming from the pressed sheets and the dust obtained from grinding of the pressed sheets are added to basin 3 by hopper 4 and proportioning screw 5 to obtain a continuously controllable throughput of vermiculite and recycle material in a given ratio. The insufficiently mixed mixture 7 of recycle material and expanded vermiculite passes via outlet 6 to a fluidized bed conveyor means 8. The latter consists of an inlet valve 9, a transport line 10, a blower 11, cyclone separator 12, air return 13 and outlet valve 14. Valves 9 and 14 are swing flap valves. The mixture 7 in transport line 10 is entrained by an air stream maintained by blower 11 in the direction of arrow 10' to form a fluidized bed of transport air and particles of mixture 7 moving in line 10 in the direction of arrow 10' to obtain a homogenous mixing of mixture 7 which is then separated from the transport air by cyclone separator 12 and passes through outlet valve 14 into silo 15.

Figure 2:
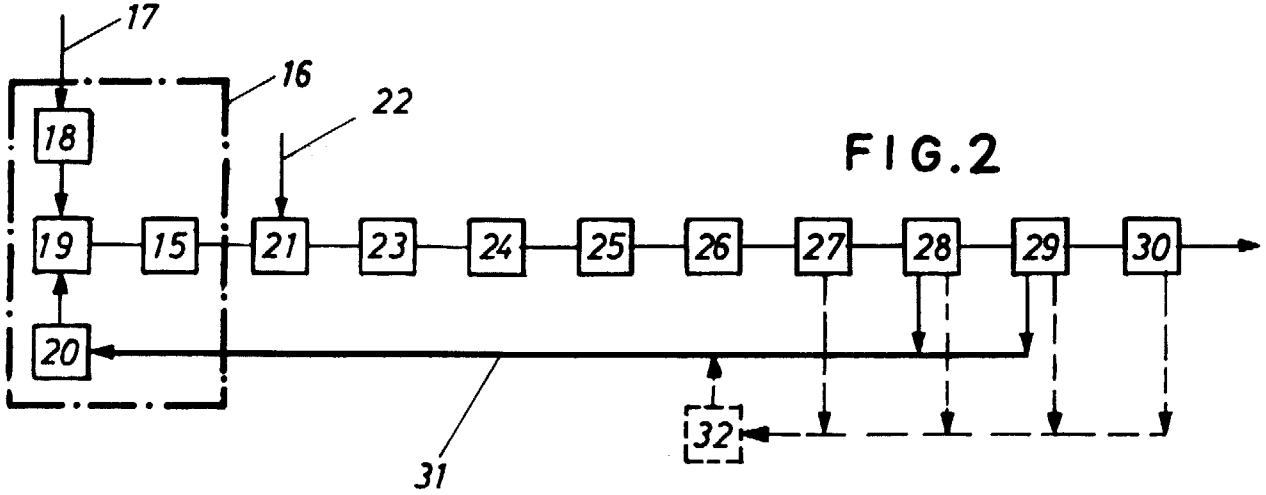
FIG. 2 is a flow diagram of the process of the invention to form a building element.

In the schematic flow diagram of FIG. 2, the area within box 16 corresponds to the apparatus illustrated in FIG. 1 with the vermiculite added at line 17 passing through the expanding unit 18, then into mixing unit 19 for uniform admixing with recycled waste via proportioning unit 20 into silo 15. The mixture of expanded vermiculite and recycled waste in silo 15 is added in intermittent batches to mixing unit 21 which may be a free-fall mixer for admixing with an aqueous binder solution added through line 22. The binder-sized mixture is passed from unit 21 to a scatter station 23 with scatter bins in which the binder mixture is applied to a framed press sheet with a uniform height. The filled press sheet is then brought to prepress unit 24 wherein the material is compressed to approximately 50% of its original height to form prepress cake or sheet and the frame is removed from the press sheet.

The press sheet and the prepress cake are placed in press 25 provided with heatable press plates and the prepress cake is compressed under pressure at elevated temperatures. The finished pressed board is then separated from the press sheet and is pressed through cooling zone 26 and then trimming unit 27 and grinding unit 28. The finished boards are stacked in packing station 29 and sent to storage area 30.

Since the trimming is usually effected with cutting heads, at least a portion of the trim waste is already in granular or powder form and this waste together with the grinding dust is passed by line 31 to proportioning means 20 for recycling with new expanded vermiculite. The larger scraps of trim material and any scrap board occuring between cooling zone 26 and storage 30 are passed to shredding means 32 to transform them into granular or powder material and is then also passed to proportioning means 20 by line 31.

In the following example there is described a preferred embodiment to illustrate the invention. However, it should be understood that the invention is not intended to be limited to the specific embodiments.

EXAMPLE

In the continuous mixing apparatus of FIG. 1, 11.8 kg of granular to powdery recycle trim waste and 11.8 kg of grinding dust are added to 100 kg of expanded vermiculite in basin 3 and the resulting mixture is homogenously mixed in fluidized bed conveyor 8 and passed into free fall mixing unit 21. To bind the mixture, 9.6 kg (dry basis) of a 50% aqueous solution of phosphate binder FFB 101 and 8.4 kg (dry basis) of a 73% aqueous solution of a phenol urea resin containing 10 mole % of a urea-formaldehyde resin were sprayed through separate spraying means onto 123.6 kg of the said vermiculite-recycle mixture in the free fall mixer.

The resulting mixture from free fall mixer 21 is applied to the framed press sheet with a density of 15.4 $kg/m^2$ and was then compressed at a pressure of 5 to 10 $kg/cm^2$ to a thickness of about 20.6 cm and the press plate was then heated under pressure to a temperature of 140°-150° C. until no water vapor could be seen rising therefrom. The fully shaped and cooled board was then ground to the desired thickness of 19 mm and the board had a weight of 670 $kg/m^3$ and a bending strength of 150 $kg/cm^2$.

For comparison purposes, a mixture of 60 kg of freshly expanded vermiculite, 5.7 kg (dry basis) of FFB 101,5 kg (dry basis) of the phenol-urea mixed resin and 1.14 kg of urea formaldehyde resin was admixed with 5 kg of shredded recycle material and the mixture was used to form a pressed building element. The process was repeated without the addition of recycle waste material. The board of the invention had a mean density of 695 $kg/m^3$ and a mean bending strength of 60 $kg/cm^2$ while the comparison board had a mean board density of 659 $kg/m^2$ and a mean bending strength of 44 $kg/cm^2$. Even though the amount of fresh raw material is less with the process of the invention, the strength valves are surprisingly greater.

Various modifications of the products and process of the invention may be made without departing from the spirit or scope thereof and it is to be understood that the invention is intended to be limited only as defined in the appended claims.

We claim:

[1. An improved building material element having good mechanical properties comprising expanded vermiculite granules coated with 2 to 30% by weight, based on the weight of vermiculite, with an organic binder formed into a press cake which is then press heated to form the building element, the improvement comprising that the press cake is press heated to have a density of at least 600 $kg/m^3$ to form the building element, that the building element formed is trimmed, that the trimmed material is shredded to granular or powdered material, and that the granular or powdered material is recycled to comprise at least a portion of the coated vermiculite particles.]

[2. The building element of claim 1 wherein the weight ratio of recycle waste material to expanded vermiculite particles is 5 to 30% based on the total weight.]

3. The building element of claim [1] *11* wherein the building element also contains up to 10% by weight of water-glass.

4. The building element of claim [1] *11* wherein the binder is a resin mixture or mixed resin with at least one combustible resin component and at least one incombustible nitrogen-containing resin component.

[5. In an improved process for the preparation of a building material element comprising forming expanded vermiculite at an elevated temperature, admixing the vermiculite with 2 to 30% by weight of the vermiculite with a binder to form a mixture of coated vermiculite, forming the resulting mixture into a prepress cake, heating the press cake under pressure to a density of at least 600 kg/m$^3$ to form the building element, the improvement comprising trimming the building element, shredding the trimmed material to produce granular or powdered material, and recycling the granular or powdered material to be admixed with the coated vermiculite.]

6. The process of claim [5] *12* wherein the vermiculite and recycle waste material are mixed in a fluidized bed.

7. The process of claim 6 wherein the expanded vermiculite is still hot from the expansion furnace.

8. The process of claim 6 wherein the fluidized bed is elongated and is used to transport the material to the next step.

9. The process of claim 6 wherein granular binders are also added to the fluidized bed.

*10. The building element of claim 11 wherein the recycle material is dust from grinding.*

*11. A building material element having good mechanical properties made by (1) mixing expanded vermiculite and 5 to 30% by weight of the vermiculite of recycled material, (2) coating the mixture with a binder, (3) forming the coated mixture into a press cake and (4) press heating the press cake to a density of at least 600 Kg/m$^3$, the said recycled material being granular or powdered material resulting from trimming and/or dust material resulting from grinding a building material element resulting from the process of steps (1) to (4) above.*

*12. A process for the preparation of a building material element comprising (1) mixing expanded vermiculite and 5 to 30% by weight of the vermiculite of recycled material, (2) coating the mixture with a binder, (3) forming the coated mixture into a press cake and (4) press heating the press cake to a density of at least 600 Kg/m$^3$, the said recycled material being granular or powdered material resulting from trimming and/or dust material resulting from grinding a building material element resulting from the process of steps (1) to (4) above.*

* * * * *